(12) United States Patent
Scholl et al.

(10) Patent No.: US 6,313,211 B1
(45) Date of Patent: Nov. 6, 2001

US006313211B1

(54) EMULSION RUBBER MIXTURES CONTAINING HYDROPHOBIC-RENDERED OXIDE OR SILICATE TYPE FILLERS AND THEIR USE FOR PRODUCING TIRES

(75) Inventors: Thomas Scholl, Bergisch Gladbach; Peter Wendling, Leverkusen; Jürgen Trimbach, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/646,815

(22) PCT Filed: Mar. 22, 1999

(86) PCT No.: PCT/EP99/01912

§ 371 Date: Sep. 22, 2000

§ 102(e) Date: Sep. 22, 2000

(87) PCT Pub. No.: WO99/51673

PCT Pub. Date: Oct. 14, 1999

(30) Foreign Application Priority Data

Apr. 2, 1998 (DE) .............................................. 198 14 839

(51) Int. Cl.$^7$ ...................................................... C08K 3/00
(52) U.S. Cl. ........................ 524/492; 524/493; 523/216
(58) Field of Search ...................... 524/492, 493

(56) References Cited

U.S. PATENT DOCUMENTS

| | | | |
|---|---|---|---|
| 2,187,146 | 1/1940 | Calcott et al. ............................ | 18/57 |
| 2,477,695 | 8/1949 | Kimberlin ............................ | 252/451 |
| 2,625,492 | 1/1953 | Young ................................ | 106/308 |
| 2,727,876 | 12/1955 | Iler ........................................ | 260/37 |
| 2,739,669 | 3/1956 | Miller ................................ | 183/114.2 |
| 2,786,042 | 3/1957 | Iler ........................................ | 260/37 |
| 3,607,337 | 9/1971 | Offenbach et al. ............... | 106/288 Q |
| 3,816,154 | 6/1974 | Baldyga et al. ...................... | 106/308 |
| 3,873,489 | 3/1975 | Thurn et al. .................. | 260/33.6 AQ |
| 3,978,103 | 8/1976 | Meyer-Simon et al. ....... | 260/448.8 R |
| 4,757,101 | 7/1988 | Kleinert et al. ...................... | 523/220 |
| 5,166,227 | 11/1992 | Raines et al. ........................ | 523/342 |
| 5,205,038 | 4/1993 | Archer et al. ................... | 29/890.031 |
| 5,663,226 | 9/1997 | Scholl et al. .......................... | 524/262 |
| 5,834,536 | 11/1998 | Scholl ................................. | 523/211 |

FOREIGN PATENT DOCUMENTS

| | | |
|---|---|---|
| 2186060 | 3/1997 | (CA) . |
| 2844052 | 4/1980 | (DE) . |
| 44 35 311 | 4/1996 | (DE) . |
| 0372251 | 6/1990 | (EP) . |
| 0890600 | 1/1999 | (EP) . |
| 0931812 | 7/1999 | (EP) . |
| 9847955 | 10/1998 | (WO) . |

OTHER PUBLICATIONS

Elsevier Amsterdam, (month unavailable), 1989, pp. 88–92, I. Franta, "Elastomers and Rubber Compounding Materials".

John Wiley & Sons, NY, (month unavailable) 1954, pp. 201–204, Whitby et al, "Synthetic Rubber".

*Primary Examiner*—Edward J. Cain
(74) *Attorney, Agent, or Firm*—Joseph C. Gil; Noland J. Cheung

(57) ABSTRACT

The present invention relates to a process for the production of rubber mixtures containing 1 to 500 parts by weight of one or more water-repellent fillers with a methanol wettability of ≧5 wt. % to 100 parts by weight of rubber, characterized in that said water-repellent fillers are blended with one or more rubber latices and the mixture is then processes jointly, and also to rubber mixtures that can be produced with this process. The present invention relates furthermore to the use of the rubber mixtures produced by the process according to the invention for the production of tires, treads or molded articles of all kinds.

10 Claims, No Drawings

EMULSION RUBBER MIXTURES CONTAINING HYDROPHOBIC-RENDERED OXIDE OR SILICATE TYPE FILLERS AND THEIR USE FOR PRODUCING TIRES

FIELD OF THE INVENTION

The present invention relates to a process for the production of rubber mixtures containing 1 to 500 parts by weight of one or more water-repellent fillers with a methanol wettability of $\geq 5$ wt. % to 100 parts by weight of rubber, characterized in that said water-repellent fillers are blended with one or more rubber latices and the mixture is then processed jointly, and also to rubber mixtures that can be produced with this process. The present invention relates furthermore to the use of the rubber mixtures produced by the process according to the invention for the production of tires, treads or molded articles of all kinds.

BACKGROUND OF THE INVENTION

The production of silica-filled rubber mixtures requires a clearly higher mixing effort in comparison with rubber mixtures filled with carbon black. On the other hand, the greater mixing effort could in principle be avoided if the silica could be coagulated with the rubber latex immediately after production of the latter. However, the precipitation silicas currently employed for the production of tires are not readily suitable for this process, since for the most part they remain in the aqueous phase in the course of coagulation.

U.S. Pat. No. 5,166,227 describes a process for the production of emulsion-rubber mixtures filled with silica, in which a dispersion of silica and a rubber latex are spray-dried jointly. This process has the disadvantage that the entire quantity of water has to be vaporized in energy-intensive manner.

U.S. Pat. No. 4,757,101 describes a process for the production of free-flowing powdered elastomers filled with silica, in which silica is precipitated with a rubber latex. In this case other silicas are employed with rubber latices for other fields of application without sulfurous silyl ethers.

U.S. Pat. No. 2,727,876 describes rubber mixtures consisting of a large number of rubber types and esterified silicas.

SUMMARY OF THE INVENTION

It has now been found that special water-repellent oxidic or siliceous fillers can be processed together with emulsion-rubber latex without appreciable portions of the fillers remaining in the aqueous phase and consequently being lost. In combination with sulfurous silyl ethers it is possible for rubber mixtures having excellent processing behaviour and vulcanisates having surprisingly good mechanical and dynamic properties to be produced which are suitable in particular for abrasion-resistant tire treads having low rolling resistance and high wet-skid resistance and which are clearly superior to the vulcanisates produced by the conventional mixing process from solid rubber and untreated or water-repellent silica.

DETAILED DESCRIPTION OF THE INVENTION

The invention provides a process for the production of rubber mixtures containing 1 to 500 parts by weight of one or more water-repellent fillers with a methanol wettability of $\geq 5$ wt. % to 100 parts by weight of rubber, characterized in that said water-repellent fillers are blended with one or more rubber latices and the mixture is then processed jointly.

Water-repellent fillers are to be understood to mean oxidic or siliceous fillers such as precipitation silicas or precipitated silicates that are not wetted by water at room temperature. Preferred fillers have a content of physically bonded water amounting to <3 wt. %, in particular <1 wt. %, and a "methanol wettability" of >5 wt. %, in particular 10 to 60 wt. %. The "methanol wettability" in this connection specifies the minimum content (in percent by weight) of methanol in a methanol/water mixture that is capable of wetting the filler.

Determination of the methanol wettability is carried out as follows:

200 mg of the silica and 50 ml water are passed into a 250-ml round-bottomed flask having a magnetic stirrer. The (partly) water-repellent silica remains on the surface of the water. Then the tip of a measuring pipette filled with methanol is immersed in the liquid phase (in order to avoid direct contact with the silica) and the methanol is allowed to flow in slowly. At the same time stirring is effected with the magnetic stirrer, so that a vortex arises in the liquid. Methanol is added until such time as the solid substance is wetted. This is the case when the silica is no longer distributed over the entire surface of the liquid phase (which already contains methanol) and the relatively clear, film-free liquid becomes visible.

Evaluation: the methanol wettability is expressed as wt. % methanol of the methanol/water mixture, in accordance with the following formula $$\text{methanol wettability (in wt. \%)} = (0.79 \times \text{number of ml MeOH}/0.79 \times \text{number of ml MeOH} + 50) \times 100$$

Numerous suitable methods for imparting water-repellency to oxidic and siliceous fillers are described in the literature, such as, for example, the treatment of precipitation silicas and precipitation silicates with inorganic and organic fluorides, as described in U.S. Pat. No. 2,477,695 and U.S. Pat. No. 2,625,492, or the production or aftertreatment of precipitation silicas by neutralization of silicate solutions with organohalosilanes such as dimethyldichlorosilane, for example, as described in DE 1 229 504.

Particularly well suited are water-repellent fillers having methanol wettability values from 10 to 60 wt. %, based on precipitation silicas or precipitated silicates that (A) before, during or after a drying treatment were added to 0.5 to 200, preferably 1 to 50, parts by weight, relative to 100 parts by weight of filler, of a water-insoluble organic compound or (B) before, during or after a drying treatment accompanied by partial or total conversion of the silanol groups were caused to react with 0.5 to 200, preferably 1 to 50, parts by weight, relative to 100 parts by weight of filler, of a compound containing hydroxyl groups or (C) before, during or after a drying treatment accompanied by partial or total conversion of the silanol groups were caused to react with 0.1 to 20, preferably 0.1 to 10, parts by weight, relative to 100 parts by weight of filler, of a reactive silicon compound.

The water-repellent fillers to be used in accordance with the invention can be produced according to method (A) by, for example, a precipitation silica or a precipitated silicate being mixed before, during or after a drying process in which the water content is lowered to less than 3 wt. %, in particular <1 wt. %, with a water-insoluble organic compound. The water content is to be understood to mean that content of physically bonded water which at a drying temperature of 105° C. can be removed within 2 hours (DIN ISO 787/2).

Suitable water-insoluble compounds in the sense of method (A) are, for example, saturated and unsaturated fatty acids and waxes as described in DE 2 419 759, synthetic plasticizers such as dioctyl phthalate, adipate, modified fatty acids such as dimerized or oligomerized fatty acids, natural unsaturated oils such as olive oil, rapeseed oil, castor oil, sunflower oil, soybean oil, cottonseed oil, linseed oil, peanut oil and also the corresponding unsaturated or hydrated fatty acids and the transesterification products thereof with monovalent to hexavalent $C_1$–$C_{20}$ alcohols, naphthenic, paraffinic or aromatic mineral oils, water-insoluble alcohols such as, for example, dodecanol, stearyl alcohol, undecylenic alcohol and oleyl alcohol, synthetic oils such as, for example, lubricating oils based on polyester or polyether, silicone oils such as, for example, polydimethyl siloxanes, dialkyl polysulfides such as, for example, dioctyl polysulfide, adducts of sulfur on unsaturated oils and on unsaturated fatty-acid esters such as, for example, reaction products of sulfur with olive oil, soybean oil or castor oil, reaction products of sulfur with unsaturated alcohols such as, for example, undecylenic alcohol and oleyl alcohol, furthermore low-molecular rubbers, in particular polybutadiene oil, liquid butadiene/acrylonitrile copolymers, liquid polyisobutylene, liquid natural rubber. Moreover use may also be made, by using solvents or in latex form, of high-molecular rubbers such as natural rubber, butadiene rubber, styrene/butadiene rubber, acrylonitrile/butadiene rubber and thermoplastics.

Said water-insoluble compounds may be applied in bulk, in solution or as latex. They are preferably applied in solvent-free manner or in the form of an aqueous dispersion. The filler may be submitted as an aqueous dispersion, in the form of a filter cake moist with water, or in predried form. A method for the application of waxes and thermoplastics to be used in accordance with the invention from aqueous dispersion during or immediately after the process for precipitating precipitation silicas is described, for example, in U.S. Pat. No. 3,607,337.

Particularly preferred water-insoluble organic compounds for the water-repellency treatment according to method (A) are natural unsaturated oils such as olive oil, soybean oil, sunflower oil, castor oil, peanut oil, their isomerisation, hydration, dehydration and polymerization products, and also the corresponding unsaturated or hydrated fatty acids and their esterification products with monovalent to hexavalent $C_1$–$C_{30}$ alcohols. Quite particularly preferred are natural unsaturated oils such as castor oil, soybean oil, peanut oil and olive oil, etc.

The water-repellent fillers that can be employed in accordance with the invention are produced according to method (B) by, for example, the siliceous or oxidic filler being caused to react before, during or after a drying process in which the water content is lowered to less than 3 wt. %, preferably <1 wt. %, with 0.5 to 200 parts by weight of a compound containing hydroxyl groups. Preferred compounds containing hydroxyl groups are $C_8$–$C_{36}$ alkyl monoalcohols and $C_5$–$C_{36}$ alkyl polyols, in particular n-octyl and iso-octyl alcohol, nonanol, decanol, dodecanol, octadecyl alcohol, octadecenyl alcohol, neopentyl glycol and trimethylolpropane. Particularly preferred compounds containing hydroxyl groups are n-octanol, ethylhexyl alcohol, 1-decanol, 1-dodecanol, octadecyl alcohol, neopentyl glycol, trimethylolpropane, 2-methylene-1,3-propanediol, 5-hexene-1,2-diol, 1,5-hexadiene-3,4-diol, 3-cyclohexene-1,1-dimethanol, 1-octene-3-ol, dodecenic alcohol, hexadecenol, oleyl alcohol, ricinoleic acid, cinnamyl alcohol, castor oil, hydroxyethyl(meth)acrylate, 4-hydroxybutyl(meth)acrylate, polybutadiene oil containing hydroxyl groups and with preferred OH numbers from 20 to 200 (Poly BD resins available from Elf Atochem or Hycar HT available from BF Goodrich), unsaturated polyesters containing hydroxyl groups and having average molecular weights from 1,000 to 20,000, water-insoluble polyethers containing hydroxyl groups, such as, for example, addition products arising from 1–100 propylene oxide per mole of unsaturated alcohol.

The compounds containing hydroxyl groups according to method (B) may be employed on their own or in a mixture or also in a mixture with the water-insoluble organic compounds according to (A), which optionally are then only physically bonded to the filler.

The reaction of the fillers with the compounds containing hydroxyl groups may preferably be effected in bulk or, furthermore, preferably in organic solvents or also in a vacuum at temperatures from above room temperature (20° C.) to below the decomposition temperature of the compound containing hydroxyl groups. With a view to carrying out esterification at temperatures below 100° C. a previous heat treatment of the oxidic or siliceous filler is advisable at temperatures from 300 to 800° C., as described in U.S. Pat. No. 2,736,669. Otherwise, temperatures from 100° C. to below the decomposition temperature of the compound containing hydroxyl groups are preferred. The oxidic or siliceous fillers may also be submitted in the form of products that are moist with water or even as a suspension in water. The residual moisture is removed from the reaction product together with the water that is formed in the course of the reaction. Removal of the reaction water advantageously takes place immediately during the reaction or in a subsequent drying step. The success of the esterification can be demonstrated, for example, by the fact that the compound containing hydroxyl groups can no longer be extracted with suitable solvents.

Suitable solvents for implementing the surface reaction with the compounds containing hydroxyl groups are, for example, saturated or unsaturated aliphatic or aromatic hydrocarbons, chlorinated aliphatic or chlorinated aromatic hydrocarbons, alcohols, etc.

The water-repellent fillers according to method (C) to be used in accordance with the invention are produced by, for example, the siliceous or oxidic filler being caused to react before, during or after a drying process in which the water content is lowered to less than 3 wt. %, preferably <1 wt. %, with 0.1 to 20 parts by weight of a silicon compound that is reactive in relation to Si-OH groups of the filler.

The silicon compounds to be used in this connection are alkoxysilanes such as, for example, tetramethoxysilane and tetraethoxysilane, alkyl alkoxysilanes such as octyltrimethoxysilane and octyltriethoxysilane, octadecyltriethoxysilane, 3-chloropropyltriethoxysilane, dimethyldiethoxysilane, trimethylethoxysilane, polydimethyl siloxanes with reactive Si-OH groups and with reactive alkoxysilyl ether groups such as, for example, methoxy and ethoxy residues, cyclic dimethylsiloxane ethers such as octamethylcyclotetrasiloxane, trimethylsilyl amines such as hexamethyldisilazane, sulfurous silyl ethers such as, for example, polysulfidic silyl ethers such as, for example, bis-(triethoxysilylpropyl) disulfide and bis-(triethoxysilylpropyl) tetrasulfide and also the polysulfidic silyl ethers disclosed in EP 466 066 and EP 670 347, thiocyanatopropyltriethoxysilane as well as mercaptopropylethoxysilane.

The reaction temperatures for this purpose lie between room temperature and the decomposition temperature of the silicon compound. The reaction may optionally be accelerated by acidic or alkaline catalysts. Examples of these are ammonia and sodium alcoholate.

For the production of the water-repellent fillers use is preferably made of precipitation silicas and/or precipitated silicates such as

- silicas produced by precipitation of solutions of silicates with spec. surfaces from 5 to 1,000, preferably 20 to 400, $m^2/g$ (BET surface area) and with primary-particle sizes from 10 to 400 nm. The silicas may optionally also be present in the form of mixed oxides with other metal oxides such as aluminium, magnesium, calcium, barium, zinc, zirconium, titanium oxides;
- silicates, for example aluminium silicate, alkaline-earth silicates such as magnesium silicate or calcium silicate, having BET surface areas from 20 to 400 $m^2/g$ and primary-particle diameters from 10 to 400 nm.

Products of this type are described more fully in, for example, I. Franta, Elastomers and Rubber Compounding Materials, Elsevier 1989, pages 401–447.

The rubber mixtures according to the invention further contain sulfurous silyl ethers that possess at least one silyl ether residue in the molecule which is capable of reacting with the Si-OH groups of the surface of the silica under the mixing conditions and that have at least one sulfurous residue in the molecule which is capable of reacting with the unsaturated rubber under the mixing conditions or vulcanization conditions.

Preferred sulfurous silyl ethers are, in particular, bis-(trialkoxysilylalkyl)polysulfides as described in DE 2 141 159 and DE 2 255 577, oligomeric and/or polymeric sulfurous silyl ethers as disclosed in DE 4 435 311 and EP 670 347, mercaptoalkyltrialkoxysilanes, in particular mercaptopropyltriethoxysilane, thiocyanatoalkylsilyl ether, as described in DE 195 44 469, for example.

Quite particularly preferred are bis-(triethoxysilylpropyl) tetrasulfide, the corresponding disulfide, and also polysulfidic silyl ethers according to EP 670 347 and DE-OS 19 529 916, produced from chloropropyltriethoxysilane, dichloroalkanes and sodium polysulfide, oligo- or poly-(4-(2-triethoxysilylethyl)cyclohexane-1,2-diyl)bisoligosulfides as disclosed in DE 4 435 311, as well as thiocyanatopropyltriethoxysilane.

The sulfurous silyl ethers are employed in quantities from 0.1 to 20 parts by weight, preferably 0.5 to 10 parts by weight, relative to 100 parts by weight of rubber. The sulfurous silyl ethers may be added in a form chemically bonded to the hydrophobic filler, in a form physically bonded to an inorganic or organic carrier, or in free form.

They are preferably admixed after the processing of water-repellent filler and emulsion-rubber latex.

In addition to natural rubber the known synthetic emulsion rubbers are also suitable emulsion rubbers. Preferred synthetic emulsion rubbers are described, for example, in W. Hofmann, Kautschuktechnologie, Gentner Verlag, Stuttgart 1980. They include, inter alia, aqueous latices of polybutadiene, butadiene/acrylic-acid-$C_{1-4}$-alkyalkyl ester, polychloroprene, polyisoprene copolymers, styrene/butadiene copolymers with styrene contents from 1 to 60, preferably 20 to 50, wt. %, styrene/butadiene copolymers with 1–20 wt. % of additional polar unsaturated monomers, in particular styrene/butadiene/acrylonitrile copolymers having styrene contents from 1 to 40% and acrylonitrile contents up to 20%, butadiene/acrylonitrile copolymers with acrylonitrile contents from 5 to 60, preferably 10 to 40, wt. %, of partially hydrated or totally hydrated NBR rubber and also mixtures of these rubbers.

For the production of motor-vehicle tires with the aid of the water-repellent fillers, natural-rubber latex and emulsion SBR and styrene/butadiene/acrylonitrile copolymer latices are particularly preferred.

With a view to joint processing of the emulsion-rubber latices with the water-repellent fillers, both components are blended and the water is removed. To this end the mixture may be concentrated by evaporation, for example in an extruder, belt drier or rotary tube furnace, or by spray drying or, preferably, by coagulation of the homogeneous mixture of rubber and filler, mechanical dehydration and removal of the residual water by evaporation at temperatures between 50 and 250° C. and optionally in a vacuum. According to the present process the emulsion rubbers may also be present in more or less totally agglomerated or coagulated form and optionally in mechanically predehydrated form with water contents >5 wt. %.

Coagulation of the rubber is preferably carried out after admixture of the water-repellent fillers. Since the fillers to be employed in accordance with the invention, in contrast with the unmodified silicas, are hydrophobic, the addition of anionic, cationic or non-ionic surfactants in quantities up to 10 wt. % relative to the filler may be advantageous with a view to achieving a better distribution. Examples of such surfactants are salts of dodecylbenzenesulfonic acid, triethylbenzylammonium chloride and adducts of 3–20 moles ethylene oxide per mole nonylphenol.

With a view to better distribution, prior to being blended with the rubber latices the water-repellent fillers may optionally be converted into an aqueous dispersion with the aid of the stated classes of surfactants.

Coagulation of the rubber is effected in accordance with known methods, such as coagulation by freezing or with the aid of acids and salts. In this connection see, for example, U.S. Pat. No. 2,187,146 or I. Franta, Elastomers and Rubber Compounding Materials, Elsevier, Amsterdam 1989, pages 88–92, and Whitby, Davis, Dunbrook, Synthetic Rubber, John Wiley & Sons, New York 1954, pages 201–204. Preferred ratios of rubber to water-repellent filler range from 100:10 to 100:150, in particular 100:20 to 100:100. Furthermore, carbon blacks and the conventional rubber auxiliaries such as, for example, stabilizers, mould-release agents, plasticizers, filler activators etc may be added. In this connection the carbon blacks may be added as an aqueous dispersion or as pure substances, the rubber auxiliaries may be added as an aqueous dispersion, applied onto a filler, or in bulk. The quantities of the added rubber auxiliaries are adjusted in accordance with the particular intended use. Preferred quantities of carbon blacks range from 0 to 30 parts by weight, stabilizer quantities range from 0.1 to 1.5 parts by weight, plasticizer quantities range from 5 to 75 parts by weight, in each case relative to 100 parts by weight of rubber, and quantities of filler activator range from 0.5 to 15 parts by weight per 100 parts by weight of filler. Mineral-oil plasticizers are to be understood to mean paraffinic, naphthenic or aromatic mineral oils with VDC numbers (viscosity/density constants) in the range from 0.79 to 1.05, preferably 0.85 to 1.0, and refractivity intercepts $R_j$ in the range from about 1.04 to 1.07. Mineral-oil plasticizers of this type are commercially available. Preferred plasticizers are aromatic mineral-oil plasticizers. Preferred filler activators are sulfurous silyl ethers.

Furthermore, additional fillers may be admixed to the rubber mixtures according to the invention in conventional manner, for example by means of a kneader, roller or extruder. Such fillers are, besides untreated oxidic or siliceous fillers, also carbon blacks. Preferred additional fillers are:

highly dispersed silicas, produced for example by precipitation of solutions of silicates or by flame hydrolysis of silicon halides having specific surfaces from 5 to 1,000, preferably 20 to 400 m$^2$/g (BET surface area) and with primary-particle sizes from 10 to 400 nm. The silicas may optionally also be present in the form of mixed oxides with other metal oxides such as Al, Mg, Ca, Ba, Zn, Zr, Ti oxides;

synthetic silicates such as aluminium silicate, alkaline-earth silicate such as magnesium silicate or calcium silicate, having BET surface areas from 20 to 400 m$^2$/g and primary-particle diameters from 10 to 400 nm;

natural silicates such as kaolin and other naturally occurring silica;

glass fibres and glass-fibre products (mats, hanks) or microscopic glass beads;

metal oxides such as zinc oxide, calcium oxide, magnesium oxide, aluminium oxide;

metal carbonates such as magnesium carbonate, calcium carbonate, zinc carbonate;

metal hydroxides such as, for example, aluminium hydroxide, magnesium hydroxide;

carbon blacks; the carbon blacks to be used in this connection are produced in accordance with the lamp-black, furnace or gas-black process and have BET surface areas from 20 to 200 m$^2$/g, such as, for example, SAF, ISAF, HAF, FEF or GPF carbon blacks;

rubber gels, in particular those based on polybutadiene, polychloroprene, SBR rubber and NBR rubber.

In particularly preferred manner highly dispersed precipitated silicas and carbon blacks are employed. The stated fillers may be employed on their own or in a mixture.

Furthermore, additional rubbers may be admixed in conventional manner to the rubber mixtures according to the invention: for the production of motor-vehicle tires, in particular natural rubber, emulsion SBR and also solution SBR rubbers having a glass-transition temperature above −50° C., which may optionally be modified with silyl ethers or other functional groups, such as are described, for example, in EP 447 066. Polybutadiene rubbers with a high 1,4-cis content (>90%) which are produced with catalysts based on Ni, Co, Ti or Nd, and also polybutadiene rubbers with a vinyl content in the range from 0 to 75%, as well as the mixtures thereof are of interest. In quite particularly preferred manner solution SBR rubbers with a vinyl content in the range from 20 to 60 wt. % and also polybutadiene rubbers with a high 1,4-cis content (>90%) are employed.

The rubber mixtures according to the invention may of course also contain other rubber auxiliary products, such as reaction accelerators, anti-ageing agents, heat stabilizers, light-screening agents, anti-ozonants, processing aids, plasticizers, tackifiers, expanding agents, dyes, pigments, waxes, extenders, organic acids, retarders, metal oxides and also activators such as triethanolamine, polyethylene glycol, hexanetriol, which are known and conventional in the rubber industry. The rubber auxiliaries are admixed in conventional quantities and are adjusted in accordance with the intended purpose in the given case. Conventional quantities are, for example, quantities in the range from 0.1 to 50 wt. %, relative to the total quantity of the rubber employed.

In addition to the aforementioned rubber auxiliary products, the known cross-linkers as described in I. Franta, Elastomers and Rubber Compounding Materials, Elsevier, Amsterdam 1989 may be added to the rubber mixtures according to the invention; sulfur, sulfur donors or peroxides are preferred. Furthermore, the rubber mixtures according to the invention may contain vulcanization accelerators such as mercaptobenzthiazoles, mercaptosulfenamides, guanidines, thiurams, dithiocarbamates, thioureas and/or thiocarbonates. The vulcanization accelerators and the aforementioned cross-linkers are conventionally employed in quantities in the range from 0.1 to 10 wt. %, preferably 0.1 to 5 wt. %, relative to the total quantity of the rubber employed in the given case.

Vulcanization of the rubber mixtures according to the invention may be effected at conventional temperatures in the range from 100 to 200° C., preferably 130 to 180° C. (optionally under a pressure of 10 to 200 bar).

Further blending of the rubbers with the other aforementioned rubber auxiliary products, cross-linkers and accelerators may be carried out in conventional manner with the aid of suitable mixing units such as rollers, internal mixers and mixing extruders.

The invention provides furthermore for the use of the rubber mixtures according to the invention for the production of molded articles of all kinds and for the production of tire treads.

Moulded articles in the sense of the invention are, for example, cable sheaths, hoses, drive belts, conveyor belts, roller coatings, shoe soles, gaskets, sealing rings and damping elements. The rubber mixtures according to the invention are particularly suitable for the production of tire treads, since tyres with these tire treads exhibit particularly low rolling resistance, particularly good wet-skid resistance and high abrasion resistance.

EXAMPLES

Example 1

Silica Made Water-repellent with Castor Oil 550 g Vulkasil S (highly active precipitated silica having a BET surface area of 180 m$^2$/g, available from Bayer AG) and 27.5 g castor oil were heated for 4 hours, subject to stirring, in a three-necked flask with agitator and distillation bridge in an oil bath to an oil-bath temperature of 220° C., whereby water distilled off. 546 g of a white powder were obtained. The silica made water-repellent in this way is, in contrast to the primary product, not wetted by water and has a methanol wettability of 15 wt. %.

Example 2

Silica Made Water-repellent with Olive Oil

The procedure of Example 1 was followed, whereby 500 g Vulkasil S (highly active precipitated silica having a BET surface area of 180 m$^2$/g, available from Bayer AG) and 50 g olive oil were heated for 4 hours to 220° C. and water distilled off. 520 g of a colorless powder were obtained. Methanol wettability: 11 wt. %.

Example 3

Production of an Emulsion-SBR/Silica Mixture

To a solution of 8.5 g Al$_2$(SO$_4$)$_3$*18H$_2$O and 46.9 NaCl and 0.94 g gelatin in 6.82 l water a solution of 3.1 g Antioxidant Vulcanox® 4020 (Bayer AG) in 234.4 g aromatic mineral oil Renopal 450 (Fuchs Mineralwerke) is added, subject to stirring. Thereupon, with vigorous stirring, 500 g of the silica according to Example 1 were added at 65° C. and thereupon 3,165 g SBR latex (Krynole® 1712 latex, solids content 19.75%, corresponding to 625 g rubber, free from mineral oil, Bayer AG), a pH value of 3–4 being adjusted simultaneously with 110 ml of 10% sulfuric acid. Stirring was continued for 1 hour at 65° C., sieving was carried out, and the residue was washed with water. The waste water contained less than 2% of the silica employed. After drying (vacuum at 70° C.), 1,301 g (96 wt. %) of a rubber/silica mixture resulted consisting of 100 phr SBR Krynol® 1712, 37.5 phr aromat mineral oil and 80phr of modified silica. Mooney viscosity ML 1+4 (100° C.) 131.

Example 4

Comparative Example

Production of an emulsion-SBR/silica mixture with a silanised silica (methanol wettability 0 wt. %)

The procedure of Example 3 was followed, whereby instead of the silica according to Example 1 500 g of a silica modified with 11.3 wt. % bis-(triethoxysilylpropyl) tetrasulfide having a BET surface area of 180 m²/g (commercial product Coupsil 8113 available from Degussa AG) were employed. The silanised silica had a methanol wettability of 0 wt. %. Result: the waste water contained more than 30 wt. % of the silica employed. The yield of rubber/silica mixture amounted after drying to 1,098 g (81 wt. %).

Example 5

Rubber Mixtures and Vulcanisates

The following rubber mixtures were produced in a 1.5-1 kneader at 130° C. Sulfur and accelerator were finally admixed on a roller at 50° C. (the stated quantities relate to parts by weight):

| | Comparison 5.A | Example 5.B according to the invention |
|---|---|---|
| Oil-extended E-SBR Rubber Krynol ® 1712 (Bayer AG) | 137.5 | 0 |
| E-SBR/silica/oil mixture according to Example 3 | 0 | 217.5 |
| Silica Vulkasil ® S (Bayer AG) | 80 | 0 |
| Zinc oxide | 3 | 3 |
| Stearic acid | 2 | 2 |
| Antioxidant Vulkanox ® 4020 (Bayer AG) | 1 | 1 |
| Silane Si 69 | 6.5 | 6.5 |
| Sulfur | 1.5 | 1.5 |
| Accelerator Vulkacit ® CZ (Bayer AG) | 1.5 | 1.5 |
| Mixing viscosity ML 1 + 4 at 100° C. (ME) | 96 | 49 |
| Vulcanisation behaviour at 160° C. measured with Monsanto MDR 2000/30 min. | | |
| Time until 6% of final torque value (minutes) | 4.9 | 4.1 |
| Time until 90% of final torque value (minutes) | 16.9 | 11.4 |

The rubber mixtures were subsequently vulcanized for 35 minutes at 160° C. The following vulcanisate properties were found:

| | | |
|---|---|---|
| Elongation at break (%)* | 660 | 464 |
| Tensile modulus at 100% elongation (MPa)* | 1.7 | 2.8 |
| Tensile modulus at 300% elongation (MPa)* | 6.6 | 11.8 |
| Hardness at 23° C. (Shore A) (according to DIN 53 505) | 69 | 72 |
| Hardness at 70° C. (Shore A) (according to DIN 53 505) | 61 | 67 |
| Tensile strength (MPa)* | 22 | 20.4 |
| Rebound elasticity at 23° C. (%) | 32 | 21 |
| Rebound elasticity at 70° C. (%) | 50 | 51 |
| Difference between rebound elasticities 70/23° C. | 18 | 30 |
| Abrasion DIN 53 516 (ccm) | 125 | 102 |

*determined by means of tensile test according to DIN 53 504 with standard rod 2.

In addition to the improved processing behaviour of the unvulcanized mixture, which manifests itself in the lower Mooney viscosity, the vulcanisate according to the invention presents advantages as regards dynamic damping, both at room temperature and at 70° C., which at the same time permits improved wet-skid-resistance and rolling-resistance behaviour of tires to be inferred, as well as considerable advantages in the abrasion behaviour.

What is claimed is:

1. Process for the production of rubber mixtures containing 1 to 500 parts by weight of one or more water-repellent fillers with a methanol wettability of $\geq 5$ wt. % to 100 parts by weight of rubber, wherein said water-repellent fillers are blended with one or more rubber latices and the mixture is then processed jointly.

2. Process according to claim 1, wherein by way of water-repellent fillers use is made of siliceous or oxidic water-repellent fillers.

3. Process according to claim 1, wherein use is made of siliceous or oxidic water-repellent fillers with a methanol wettability in the range from 10 to 60 wt. %.

4. Process according to claim 1, wherein before, during or after the processing 0.1 to 20 parts by weight of one or more sulfurous silyl ethers, relative to 100 parts by weight of rubber, are added.

5. Process according to claim 1, wherein before, during or after the processing 0.1 to 20 parts by weight of one or more disulfidic or polysulfidic silyl ethers are added.

6. Process according to claim 1, wherein said emulsion latex is a butadiene rubber latex, a styrene/butadiene rubber latex, a styrene/butadiene/acrylonitrile rubber latex, a natural-rubber latex or a mixture consisting of one or more of these latices.

7. Process according to claim 1, wherein during said processing process up to 100 parts by weight of mineral oil, relative to 100 parts by weight of rubber, are added.

8. Process according to claim 1, wherein prior to admixing the water-repellent filler the rubber latex or rubber latices is/are coagulated.

9. A rubber mixture comprising 1 to 500 parts by weight of one or more water-repellent fillers with a methanol wettability of $\geq 5$ wt/ % to 100 parts by weight of rubber, wherein said water-repellent fillers are blended with one or more rubber latices and the mixture is then processed jointly.

10. Molded articles comprising at least one rubber mixture comprising 1 to 500 parts by weight of one or more water-repellent fillers with a methanol wettability of $\geq 5$ wt/ % to 100 parts by weight of rubber, wherein said water-repellent fillers are blended with one or more rubber latices and the mixture is then processed jointly.

* * * * *